INVENTOR.
JOHN W. KORDA
BY Williams, David,
Hoffmann & Yount.
ATTORNEYS

United States Patent Office 3,230,442
Patented Jan. 18, 1966

3,230,442
ALTERNATOR CONTROL UTILIZING SEMICONDUCTOR CONTROLLER RECTIFIERS
John W. Korda, East Cleveland, Ohio, assignor to The Leece-Neville Company, Cleveland, Ohio, a corporation of Ohio
Filed July 13, 1962, Ser. No. 209,719
6 Claims. (Cl. 322—28)

The present invention relates to regulating systems and, more particularly, to regulators for electric generating systems of the alternator type.

Static circuit elements including controlled rectifiers have been used to control the energization of the field winding of a generating machine such as an alternator. Controlled rectifiers are semiconductor switching devices of the avalanche type which are switched on by applying a current signal to a gate or control electrode and are extinguished when the anode-to-cathode potential of the rectifier drops below an extinguishing potential, usually about zero volts, the gate electrodes losing control after the rectifier is switched on. In control systems which have used such semiconductor switching devices to switch the field current on and off, the devices, when they have been connected between phase windings of the alternators and the field windings, have conducted current for only about five-sixths of an alternator cycle at the maximum and the current availability has been limited by the circuit arrangements used.

It is an important object of the present invention to provide a new and an improved regulating circuit in which semiconductor controlled rectifiers control current flow from the phase winding of the generating machine to the field winding and in which the time during the alternator cycle during which the rectifiers may be conductive is increased.

Another object of the present invention is to provide a new and improved regulating circuit for a generating machine, such as an alternator, having a plurality of phase windings and a field winding, and in which controlled rectifiers connect the field winding to the phase winding to effect energization of the field winding, with the circuit arrangement being such that the rectifiers are capable of being conductive for different periods of the alternator cycle, enabling field current to flow for substantially the entire cycle.

In accordance with the preferred embodiment of the present invention, a generating machine has a plurality of phase windings connected through a plurality of controlled rectifiers to the field winding of the machine with respective phase windings supplying current to the field winding during periods of the generating machine cycle which are different and the controlled rectifiers being rendered conductive in response to the output of the machine falling to a predetermined level and being extinguished once during each cycle and being rendered nonconductive when the output of the machine rises to a predetermined higher level.

Further objects and advantages of the present invention will be apparent from the following detailed description of the preferred embodiment of the present invention made with respect to the accompanying drawings, forming a part of the present specification, and in which.

Figure 1:
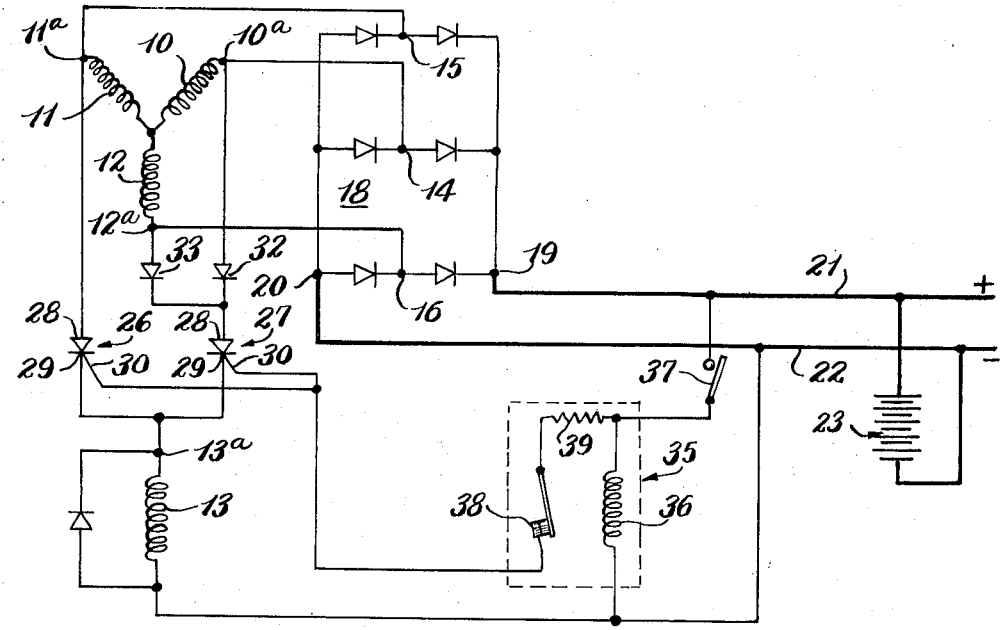
FIG. 1 is a diagrammatic circuit showing a regulating system for an alternator embodying the present invention.
Figure 2:
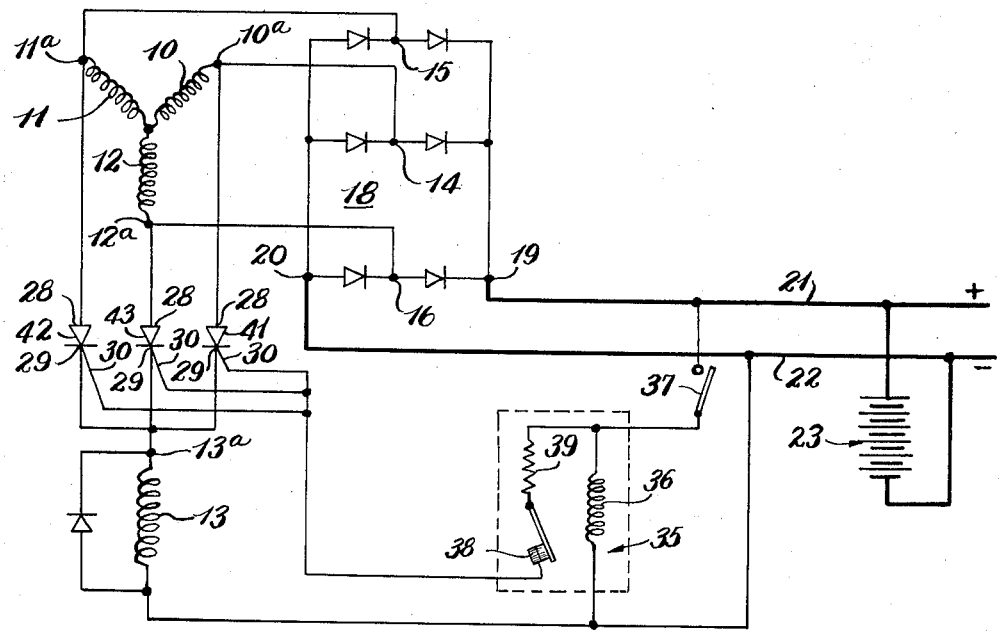
FIG. 2 is a diagrammatic showing of a regulating circuit for an alternator which embodies the present invention but which is different from FIG. 1.
Figure 3:
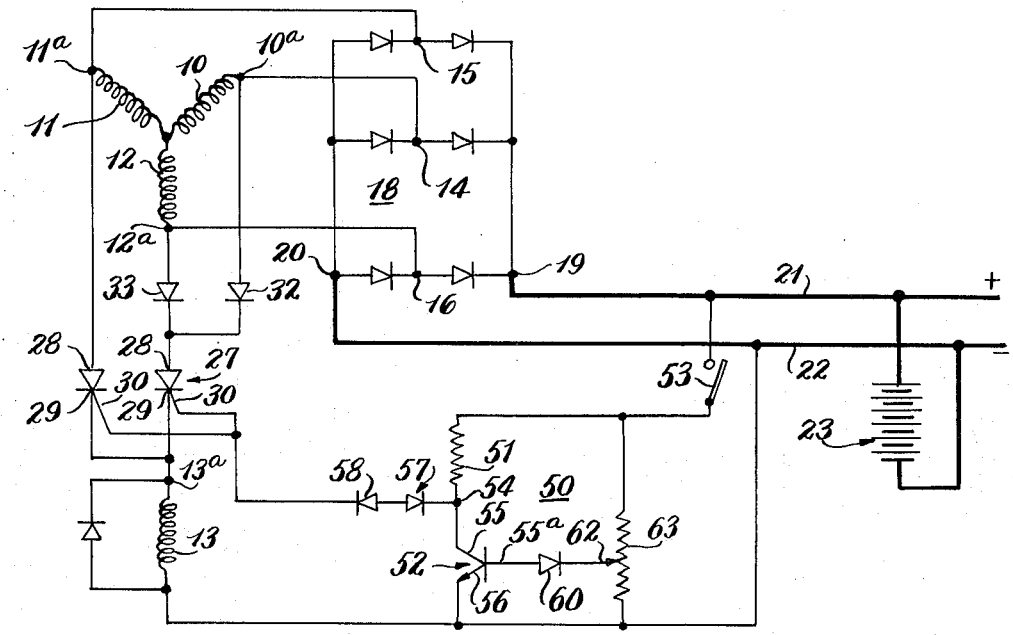
Figure 4:
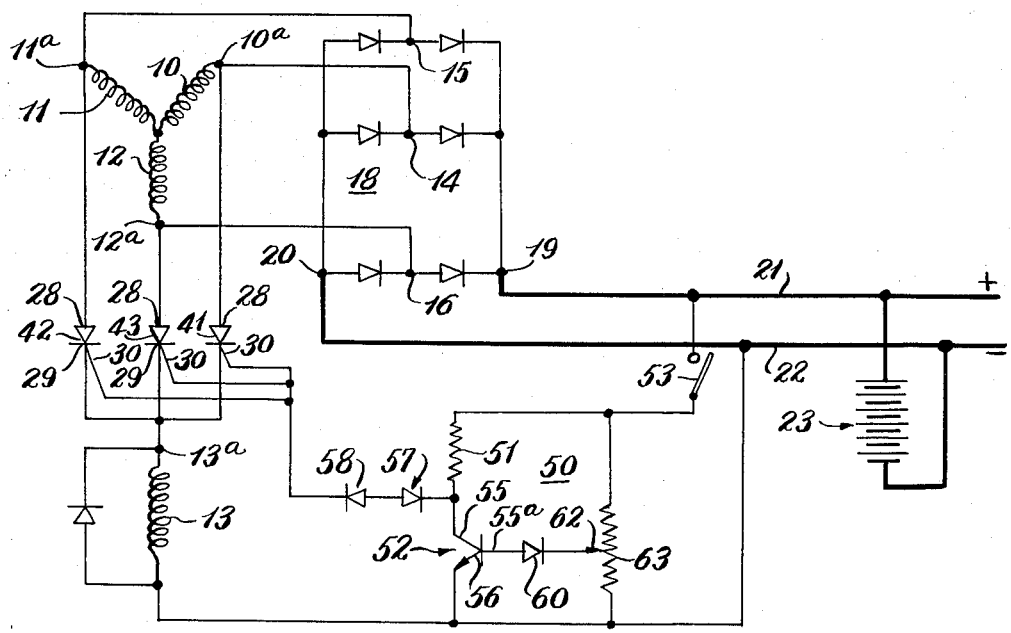

FIG. 3 is a diagrammatic circuit arrangement of a regulating system for an alternator embodying the present invention and similar to FIG. 1 except for the control means which switches the semiconductor devices controlling the field current off and on; and FIG. 4 is a diagrammatic circuit diagram of a regulating circuit for an alternating machine embodying the present invention and similar to FIG. 2, but having a different control means for sensing the output of the alternator and rendering the semiconductor devices conductive.

Referring to the embodiment of the invention shown in FIG. 1, a regulating system embodying the present invention is shown as controlling the output of an alternator having three-phase Y-connected inductor phase windings 10, 11, 12 and a field winding 13. The phase windings 10, 11, 12 have output terminals 10a, 11a, 12a respectively connected to input terminals 14, 15, 16 of a full-wave rectifier 18. The full-wave rectifier 18 has positive and negative output terminals 19, 20 connected to supply a current to positive and negative load conductors 21, 22 across which a battery 23 may be connected.

The output of the alternator is controlled by controlling the energization of the field winding 13 which is energized from the phase windings of the alternator. To this end, the positive terminal 13a of the field winding 13 is connected to the terminal 11a of the phase winding 11 through a semiconductor controlled rectifier 26. The positive terminal 13a of the field winding 13 is also connected to the phase terminals 10a, 12a of the phase windings 10, 12, respectively, through a semiconductor controlled rectifier 27. The controlled rectifiers are semiconductor switching devices of the avalanche type and each have an anode connection 28, a cathode connection 29, and a gate electrode connection 30. The anode 28 of the controlled rectifier 27 is connected to the phase terminals 10a, 12a through respective blocking diodes 32, 33. If the phase terminal 10a is positive with respect to the phase terminal 12a and with respect to the field winding 13a, the diode 32 will be conductive provided the controlled rectifier 27 is switched on; while, if the phase terminal 12a is positive with respect to the phase terminal 10a under the same conditions, the diode 33 will be conductive. Consequently, for practical purposes, the current supplied to the field winding through the controlled rectifier 27 is supplied either through the diode 32 or through the diode 33.

The controlled rectifiers 26, 27 are commercially available devices and are rendered conductive when the anodes 28 thereof are positive with respect to the cathodes 29 thereof, by applying a current signal to the gate electrode 30. The polarity of the current signal required to render the devices conductive is such that the gate electrodes are positive with respect to the cathodes and the switching current flows between the gate electrode and the cathode of the device to render the latter conductive. When the rectifiers have been rendered conductive, the gate electrodes lose control and the rectifiers are subsequently extinguished when the anode-to-cathode potential falls to approximately zero.

In the embodiment of FIG. 1, "on" currents are applied to the gate electrode 30 when the output of the machine falls to a predetermined level, with the currents being discontinued when the output subsequently rises to a predetermined higher level. The "on" currents are controlled by output sensing means comprising a differential relay 35 having a relay coil 36 connected across the load conductors 21, 22 with one side of the relay coil being connected to the load conductor 21 through a switch 37. When the relay coil 36 is actuated, it opens normally closed contacts 38 which connect the gate electrodes 30 of the switching devices 26, 27 to the conductor 21 through the switch 37 and a resistor 39. When the relay 36 is in its non-actuated condition, the contacts 38 are closed. The relay 35 is actuated by the current at the higher level of the regulation to be maintained and has a drop-out voltage where the contacts 38 close at a lower level of the voltage output. Consequently, the contacts 38 will be opened when the higher level of regulation is reached for the output of the machine and will remain open until the level drops to the lower level of regulation where the contacts will again close. Such differential relays are well known to those skilled in the art.

When the contacts 38 and the switch 37 are closed, "on" current will flow from the positive load conductor 21 through the gate electrode 30 of each of the switching devices 26, 27 and their cathodes 29 to the positive terminal 13a of the field coil 13, and through the field coil 13 to the conductor 22 to switch the rectifiers 26, 27 on when the anodes are sufficiently positive with respect to the cathodes. It will be noted that the control current flows through the field coil 13 to add to the residual magnetism and build up the voltage when the alternator is started. With the "on" currents established in the switching devices 26, 27, the devices will conduct current from the phase windings to the field coil 13 when the respective terminals to which the switching devices are connected are sufficiently positive with respect to the negative load conductor 22 so that the anodes of the semiconductor devices will be positive with respect to the cathodes. When the "on" signals are applied to the gate electrodes 30, the one of the rectifiers 26, 27 whose anode is the most positive will conduct. If this is the rectifier 27, the one of the diodes 32, 33 whose anode is at the higher potential will be conductive and the other blocked. Consequently one phase winding at a time will supply current but current will be available for substantially the entire alternator cycle. Each of the rectifiers will be extinguished during the cycle when the anode-to-cathode voltage falls to about zero, but will again be switched on when the anode is positive with respect to the cathode provided the contacts 38 are still closed to provide the "on" signal.

As the output of the machine comes up to the higher level of regulation, the relay coil 36 will open the contacts 38 and break the circuit for the control current to the control electrodes 30. The conductive one of the controlled rectifiers 26, 27 will continue to conduct after the control current is broken until the voltage between the anode and cathode of the rectifier drops to the extinguishing potential for the rectifier, and this will occur when the phase terminal or terminals to which the anode of the rectifier is connected drops to the same voltage as the field terminal 13a or below. Each phase terminal will fall below the potential of field terminal 13a for a period during each cycle of the alternator and therefore all the rectifiers will be extinguished and rendered nonconductive within a cycle of operation after the "on" signal is removed from the gate electrodes 30.

The circuit of FIG. 2 is similar to the circuit of FIG. 1 but uses a separate controlled rectifier to connect each of the phase windings of the alternator to the field winding. The elements of the circuit of FIG. 3 have been given the same number as the corresponding elements of the circuit of FIG. 1 but the controlled rectifiers have been designated by the reference numerals 41, 42 and 43. The controlled rectifier 41 connects the phase terminal 10a to the field terminal 13a, the controlled rectifier 42 connects the phase terminal 11a to the field terminal 13a and the controlled rectifier 43 connects the phase terminal 12a to the field terminal 13a. The operation of the circuit of FIG. 3 is similar to that of FIG. 1 but the circuit has a larger current capacity since the average current carried by each of the controlled rectifiers 41, 42, 43 is less than that carried by the controlled rectifier 27 in the first-described embodiment. In the operation, only one of the controlled rectifiers 41, 42, 43 will be conductive at any given time, the conductive one being the controlled rectifier whose phase terminal has the most positive voltage applied thereto. When the "on" signal is removed from the gate electrodes of the controlled rectifiers, the rectifiers will extinguish within a cycle, as in the first-described embodiment, and will remain extinguished until the "on" signal is once again applied to the gate electrodes. When the "on" signal is applied to the gate electrodes, the controlled rectifiers will be conductive once again during that period of the cycle when the phase terminal to which it is connected is the most positive with respect to the field terminal 13a.

FIG. 3 corresponds to the circuit of FIG. 1 except for the fact that the differential relay 35 of FIG. 1 is replaced by a voltage-sensing circuit comprised of static circuit elements. The voltage-sensing circuit has been designated by the reference numeral 50 and the parts of the regulating circuit corresponding to the parts of FIG. 1 have been given the same reference numerals as the corresponding parts in FIG. 1. The voltage-sensing circuit 50 includes a resistance 51 and an NPN transistor 52 connected in series between the negative load conductor 22 and the positive load conductor 21. The transistor 52 has a collector electrode 55, an emitter electrode 56, and a base electrode 55a. The positive end of the resistor 51 is connected to the load conductor 21 by a switch 53 and the negative end of the resistor 51 is connected to a junction 54 which is connected to the collector electrode 55 of the transistor 52 with the emitter electrode 56 of the transistor being connected to the negative load conductor 22. The gate electrodes 30 are connected to the junction 54 by a conduction including a voltage breakdown device shown as a Zener diode which is a semiconductor device of the avalanche type. The conductor also includes a diode 58 poled to conduct current flowing from the positive load conductor 21 through the Zener diode 57 to the gate electrodes 30.

On starting, the transistor 52 is nonconductive and as the output of the alternator builds up, the junction 54 becomes positive with respect to the negative load conductor 22. When the breakdown voltage of the Zener diode is reached, it breaks down and the "on" current signal flows in the gate circuit from the positive load conductor 21 to the gate electrodes 30 and from thence to the cathodes of the controlled rectifiers 20 and through the field winding 13. When the "on" signal current is established, the controlled rectifiers will respectively be conductive when the phase terminal or one of the phase terminals to which it is connected is the most positive with respect to the potential of the field terminal 13a.

The transistor 52 is switched from a nonconductive state to a conductive state to switch the "on" signal for the gate electrodes 30 off when the output of the alternator rises to its higher level of regulation. To this end, a Zener diode 60 is connected in the base circuit of the transistor and breaks down at the higher level of regulation to cause an input current to flow in the transistor 52. The Zener diode 60 is connected to the base electrode 55a of the transistor 52 and to a tap 62 of a potentiometer 63 connected in series with the switch 53 across the conductors 21, 22. The sliding tap 62 is adjustable to adjust the voltage between conductors 21, 22 at which the Zener diode 60 breaks down. When input current flows in the base circuit of the transistor 52 and renders the conductor 52 conductive, the potential of the terminal 54 falls to a low voltage, approximately that of the negative conductor 22, insufficient to maintain the Zener diode 57 in a conductive state. The Zener diode 57 therefore ceases to conduct and the "on" current signal ceases to flow to the gate electrodes 30. Therefore, the controlled rectifiers 26, 27 will cease to conduct when the anodes thereof next fall below the potential of the field terminal 13a. When all rectifiers have been extinguished, the potential drop between the junction 54 and the negative conductor 22 is insufficient to break down the Zener diode 57 as long as the transistor 52 is conductive. However, when the voltage of the alternator drops to a predetermined lower level, the Zener diode 60 ceases to conduct and this renders the transistor 52 nonconductive. At this time, the junction 54 will rise in voltage and the Zener diode 57 will again break down to cause an "on" gate current to flow to the gate electrodes 30.

FIG. 4 corresponds to FIG. 2 with the differential relay 35 thereof replaced by the sensing means 50 of the circuit of FIG. 3. The sensing means 50 in the circuit of FIG. 4 will operate in the same manner as it does in FIG. 3 to switch the gate control currents off and on to maintain a regulated voltage at the output of the alternator.

From the foregoing, it can be seen that in the preferred embodiments of the present invention, output sensing means, differential relay 35 in the case of FIGS. 1 and 2 and the voltage-sensing means 50 in the case of FIGS. 2 and 3, is provided to sense the output level of the alternator and to turn current signals to the gate electrodes of controlled rectifiers off and on, the controlled rectifiers being connected between the field winding and phase terminals of the alternator. A plurality of such controlled rectifiers are provided so that current is available for substantially the entire cycle of the alternator, with the rectifiers being so connected that the controlled rectifiers will be extinguished during a period of each portion of the alternator cycle. As the output of the alternator rises toward a predetermined level, which is to be the maximum level for the output, the differential relay 30 or the voltage-sensing means 50 operates to switch on the gate control currents to the controlled rectifiers. The controlled rectifiers will then become conductive in turn when the anodes thereof become positive with respect to the cathodes thereof to conduct current to the field winding. Current flow in the disclosed circuits will be available for substantially the entire cycle through one or another of the controlled rectifiers, but, yet, each of the controlled rectifiers will be extinguished at some time during the cycle when its anode voltage drops to its cathode voltage. When the voltage rises to the predetermined maximum value of regulation to be maintained, the differential relay opens the contacts 38 or the Zener diode 60 breaks down, so that the "on" signals are switched off and the controlled rectifier which is conducting will be extinguished when the anode potential thereof next falls to approximately zero with respect to the cathode potential thereof. The controlled rectifiers will remain off until the voltage level drops to a point where either the differential relay drops out to close its contacts or the Zener diode 60 in the voltage-sensing means 50 ceases conducting to render the transistor 52 nonconductive to raise the voltage of terminal 54 and switch the gate current back on.

While preferred embodiments of the present invention have been described in considerable detail, it is hereby my intention to cover all modifications, constructions and arrangements which fall within the ability of those skilled in the art and within the scope and spirit of the present invention.

Having described my invention, I claim:

1. In a generating machine having a plurality of phase windings in which alternating currents are induced and an output terminal for each phase winding, a field winding whose energization controls the voltages induced in said phase windings, means for supplying the primary excitation current for said winding comprising a plurality of controlled rectifiers of the semi-conductor type having anode-cathode circuits connected between said terminals and a common junction connected to one side of said field winding whereby said field winding is primarily energized through said rectifiers from said phase windings, said rectifiers being connected to different phase windings and blocking the field current in said winding when nonconductive and each having a control electrode to which an on current signal may be applied to condition the rectifiers to be conductive when the anode thereof is positive with respect to the cathode thereof, said control electrodes losing control of the magnitude of the current flow through the rectifiers when the rectifiers are conductive due to avalanche breakdown of the rectifiers; circuit means connected to each of said control electrodes for applying a common current signal thereto for switching said rectifiers on including a switching device and an output sensing means connected to the output of the machine for sensing the output of said machine and responsive to the output of said machine for operating said switching device off and on to switch the current signal off and on when the output of the machine respectively rises to a predetermined level and drops to a predetermined lower level.

2. In a generating machine according to claim 1 wherein one of said controlled rectifiers is connected to a plurality of said terminals by circuit means comprising a first diode connecting said one of said controlled rectifiers to one of said phase terminals and a second diode connecting said one of said controlled rectifiers to another of said phase terminals, whereby said one controlled rectifier is energizable by current from one or the other of corresponding phase windings depending on the relative polarities of their phase terminals.

3. In a generating machine having a plurality of phase windings in which alternating currents are induced and an output terminal for each phase winding, a field winding whose energization controls the voltages induced in said phase windings, a respective controlled rectifier of the semiconductor type connecting each of said phase terminals to one side of said field winding whereby said field winding is energizable through said rectifiers and the field current in said field winding is switched off by rendering said rectifiers nonconductive, said rectifiers each having a control electrode to which an on current signal may be applied to condition the rectifiers to be conductive when the anode is positive with respect to the cathode, said control electrodes losing control of the magnitude of the current flow through the respective rectifier when the respective rectifier is conductive due to avalanche breakdown, and output sensing means connected to said electrodes and to the output of said machine for sensing the output of said machine and applying a common on current signal to said electrodes and including a switching device connected to each of said electrodes and responsive to the machine output to switch the current signal off and on when the output of the machine respectively rises to a predetermined level and drops to a predetermined lower level.

4. In a generating machine having a plurality of phase windings in which an alternating current is induced and an output terminal for each winding, a field winding whose energization controls the voltages induced in said phase windings, a plurality of controlled rectifiers of the semiconductor type each having an anode, a cathode and a control electrode, said rectifiers being operable to a nonconductive condition to block the current in said field winding, circuit means connecting said anodes to said terminals with each of said anodes being connected to different terminals, second circuit means connecting said cathodes to one side of said field winding whereby said field winding is energizable by current flowing from said phase windings through said rectifiers to said field winding, said rectifiers each being rendered conductive when the anode thereof is positive with respect to the cathode by establishing an on current signal between the control electrode and the cathode of the rectifier, output sensing means connected to the output of said machine for establishing on currents in said rectifiers flowing from the control electrodes thereof to the cathodes and through said field winding and responsive to the output of the machine to establish said on current when the output falls to a predetermined level and to switch said on current off when the output of the machine rises to a predetermined higher level comprising switching means operable to apply a common on current signal to said electrodes and to switch said on current signal off.

5. In a generating machine for energizing positive and negative load conductors and having a plurality of phase windings in which alternating currents are induced and an output terminal for each phase winding, a field winding whose energization controls the voltages induced in said phase windings, a plurality of controlled rectifiers of the semiconductor type having anode-cathode circuits connected between said terminals and a common junction connected to one side of said field winding whereby said field winding is energizable through said rectifiers from said phase windings, said rectifiers being connected to different phase windings and having a cotnrol electrode to which an on current signal may be applied to condition the rectifiers to be conductive when the anode thereof is positive with respect to the cathode thereof, said control electrode of each rectifier losing control of the magnitude of the current flow between the anode and cathode of the rectifier when the rectifier is conductive due to avalanche breakdown, a differential current relay having an operating coil connected across said conductors and contacts connected to said electrodes to apply current signals to said electrodes and for switching the current signal off and on when the output of the machine respectively rises to a predetermined level and drops to a predetermined lower level.

6. In a generating machine for energizing positive and negative load conductors and having a plurality of phase windings in which alternating currents are induced and an output terminal for each phase winding, a field winding whose energization controls the voltages induced in said phase windings, a plurality of controlled rectifiers of the semiconductor type having anode-cathode circuits connected between said terminals and a common junction connected to one side of said field winding whereby said field winding is energizable through said rectifiers from said phase windings, said rectifiers being connected to different phase windings and having a control electrode to which an on current signal may be applied to condition the rectifiers to be conductive when the anode thereof is positive with respect to the cathode thereof, said control electrode of each rectifier losing control of the magnitude of current flow between the anode and cathode of the rectifier when the rectifier is conductive due to avalanche breakdown, output sensing means connected across said load conductors and to said electrodes for establishing on signal currents in said rectifiers, said sensing means comprising a circuit connecting a Zener diode, and switching means for raising and lowering the potential of the cathode of said Zener diode in response to the output of the machine respectively falling to a predetermined level where said rectifiers are to be switched on to a predetermined higher level.

References Cited by the Examiner
UNITED STATES PATENTS

| | | | |
|---|---|---|---|
| 3,009,091 | 11/1961 | Hallidy | 322—28 |
| 3,032,701 | 5/1962 | Krausz | 322—28 |

LLOYD McCOLLUM, *Primary Examiner.*